US009466860B2

United States Patent
Noda et al.

(10) Patent No.: US 9,466,860 B2
(45) Date of Patent: Oct. 11, 2016

(54) BATTERY PACK

(71) Applicants: Masafumi Noda, Anjo (JP); Hisakazu Okabayashi, Anjo (JP); Takayoshi Endo, Anjo (JP)

(72) Inventors: Masafumi Noda, Anjo (JP); Hisakazu Okabayashi, Anjo (JP); Takayoshi Endo, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 508 days.

(21) Appl. No.: 13/671,852

(22) Filed: Nov. 8, 2012

(65) Prior Publication Data
US 2013/0113427 A1 May 9, 2013

(30) Foreign Application Priority Data

Nov. 9, 2011 (JP) .................................. 2011-245773

(51) Int. Cl.
*H01M 10/42* (2006.01)
*H01M 10/46* (2006.01)
*H02J 7/02* (2016.01)

(52) U.S. Cl.
CPC ............. *H01M 10/42* (2013.01); *H01M 10/46* (2013.01); *H02J 7/027* (2013.01)

(58) Field of Classification Search
CPC ............................................... H01M 10/4257
USPC .......................................................... 320/112
See application file for complete search history.

(56) References Cited

U.S. PATENT DOCUMENTS

| 4,709,202 A | 11/1987 | Koenck et al. | |
|---|---|---|---|
| 5,783,322 A * | 7/1998 | Nagai ................... | H01M 10/48 320/134 |
| 7,956,575 B2 * | 6/2011 | Kawano et al. ............. | 320/113 |
| 2005/0127871 A1 | 6/2005 | Orikasa | |
| 2007/0075685 A1 | 4/2007 | Aradachi et al. | |
| 2007/0103113 A1 * | 5/2007 | Embrey et al. ............... | 320/112 |
| 2010/0085008 A1 * | 4/2010 | Suzuki ...................... | B25F 5/00 320/112 |
| 2010/0085020 A1 * | 4/2010 | Suzuki et al. ................ | 320/157 |

FOREIGN PATENT DOCUMENTS

| JP | H09-140066 A | 5/1997 |
|---|---|---|
| JP | 2004-064861 A | 2/2004 |
| JP | 2006-115993 A | 5/2006 |
| JP | 2008-005593 A | 1/2008 |
| JP | 2008-283786 A | 11/2008 |
| JP | 2010-093953 A | 4/2010 |
| JP | A-2010-162656 | 7/2010 |

OTHER PUBLICATIONS

Jan. 27, 2015 Office Action issued in Japanese Application No. 2011-245773.
Jul. 14, 2015 Office Action issued in Japanese Patent Application No. 2011-245773.
Dec. 3, 2015 Search Report issued in European Patent Application No. 12191784.3.
Mar. 8, 2016 Office Action issued in Japanese Patent Application No. 2011-245773.

\* cited by examiner

*Primary Examiner* — Edward Tso
*Assistant Examiner* — Jerry D Robbins
(74) *Attorney, Agent, or Firm* — Oliff PLC

(57) ABSTRACT

A battery pack according to the present invention includes a battery, a control unit, a power supply circuit, and a supply source selection unit. The power supply circuit is configured to receive electric power selectively from one of the battery and a charger, and generate a voltage for driving the control unit. The supply source selection unit is configured to select the charger as a power supply source to the power supply circuit when the battery is in a state of being able to supply electric power to the power supply circuit, the battery pack is attached to the charger and it is possible to supply electric power to the power supply circuit also from the charger.

7 Claims, 6 Drawing Sheets

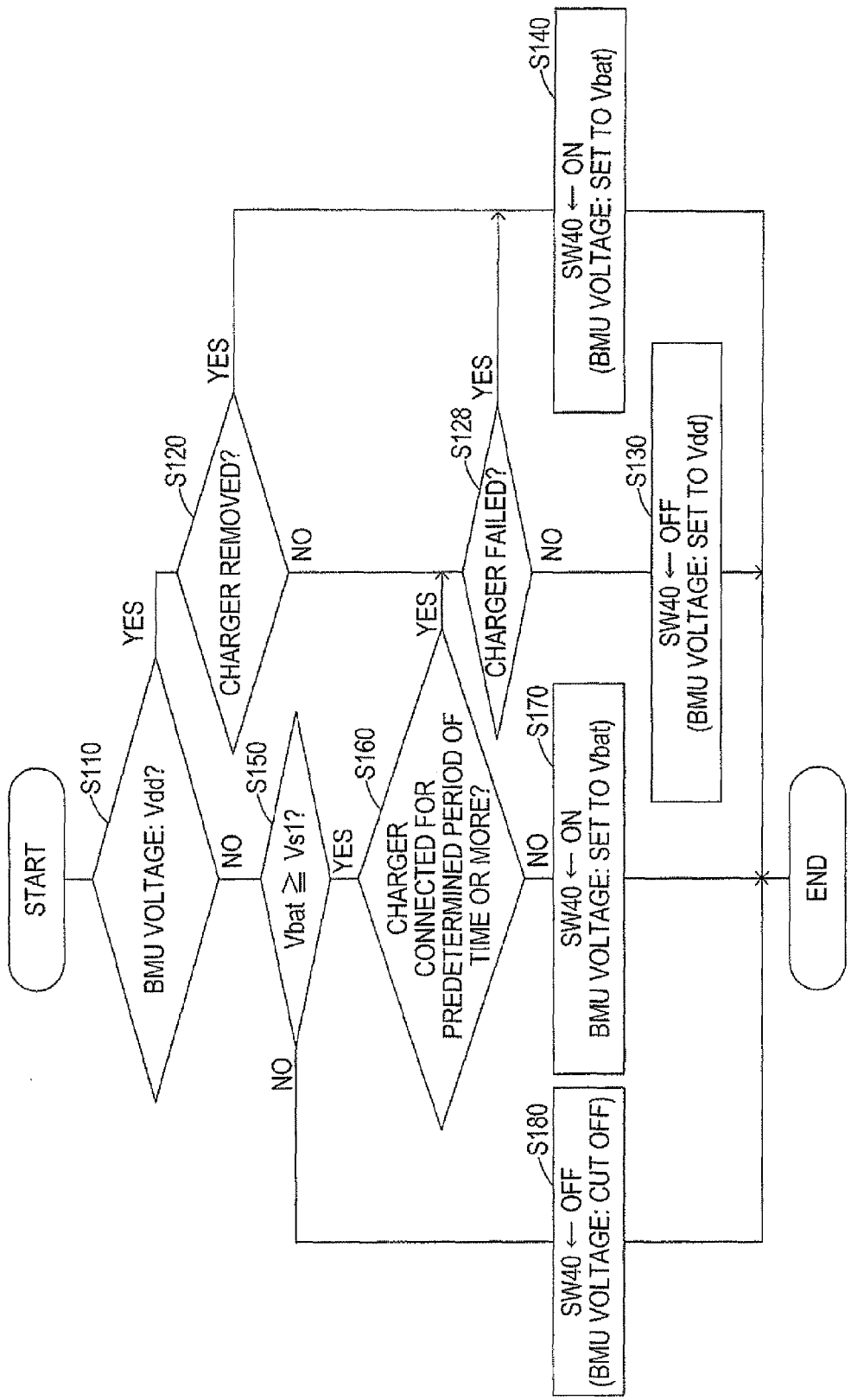

BATTERY PACK

CROSS-REFERENCE TO RELATED APPLICATIONS

This application claims the benefit of Japanese Patent Application No. 2011-245773 filed Nov. 9, 2011 in the Japan Patent Office, the disclosure of which is incorporated herein by reference.

BACKGROUND

The present invention relates to a battery pack that includes a battery, and can perform charges to the battery from a charger and power supply (discharges) to electrically-powered equipment from the battery.

A battery pack attached to electrically-powered equipment such as an electric power tool and an electrically-operating machine and supplying electric power to the electrically-powered equipment is provided with not only a battery but also a control circuit that monitors a battery voltage and a current which flows during a charge and a discharge to and from the battery so as to control the charge and the discharge to and from the battery.

In addition, the battery pack is also provided with a power supply circuit which receives power supply from the battery to generate a power supply voltage for driving the control circuit.

In this type of the battery pack, it is conceivable that, when electric power is supplied from the battery to the power supply circuit (and to the control circuit) at all times, the battery comes into an overdischarged state and becomes deteriorated.

Therefore, one example of the battery pack disclosed in Japanese Unexamined Patent Application Publication No. 2010-162656 is configured to cut off a power supply path to the power supply circuit from the battery when the battery voltage falls below an overdischarge determination voltage.

Further, according to this example, while the battery pack is attached to the charger, a power supply voltage generated in the charger is applied to the power supply circuit in the battery pack through a diode for backflow prevention. Thereby, the battery is inhibited from being overdischarged.

SUMMARY

In the above example, when the battery pack is attached to the charger, a charge to the battery from the charger is carried out. When the battery is fully charged, the charge to the battery from the charger is stopped.

When the battery pack remains attached to the charger after the charge to the battery has been completed as above, a current flows from the battery to the power supply circuit (and to the control circuit), and the battery is discharged.

This discharge continues until the battery voltage decreases to the power supply voltage supplied from the charger to the power supply circuit.

Therefore, if a user attaches the battery pack to the charger to start a charge to the battery and forgets to remove the battery pack from the charger, then electrically-powered equipment cannot be powered from the battery even if the battery pack is attached to the electrically-powered equipment. The battery has to be charged again.

It is desirable that one aspect of the present invention can provide a battery pack that supplies electric power to electrically-powered equipment in which the battery can be inhibited from being discharged to an extent that the battery is unable to supply electric power to the electrically-powered equipment, due to continuance of a state of being attached to the charger after the battery is attached to the charger and a charge to the battery is completed.

A battery pack according to the present invention is configured to be attachable to a charger and electrically-powered equipment, and includes a battery, a control unit, a power supply circuit, and a supply source selection unit. The battery is configured to be chargeable by the charger. The control unit monitors a state of the battery to control charges to the battery and discharges from the battery. The power supply circuit receives electric power selectively from one of the battery and the charger, and generates a voltage for driving the control unit. The supply source selection unit selects the charger as a power supply source to the power supply circuit when the battery is in a state of being able to supply electric power to the power supply circuit, the battery pack is attached to the charger and it is possible to supply electric power to the power supply circuit also from the charger, In the battery pack configured as such, even if a user, after attaching the battery pack to the charger to charge the battery, forgets to remove the battery pack from the charger, the battery is not to be discharged through the power supply circuit (and further through the control unit). Thus, when the battery pack is attached to the electrically-powered equipment thereafter, power supply to the electrically-powered equipment from the battery can be carried out.

The supply source selection unit, in a case where the battery is in a state of being able to supply electric power to the power supply circuit, the battery pack is attached to the charger and it is possible to supply electric power to the power supply circuit also from the charger, may be configured to select the battery as a power supply source to the power supply circuit if an output voltage from the battery is equal to or greater than a predetermined threshold voltage, and to select the charger as a power supply source to the power supply circuit if the output voltage from the battery is smaller than the threshold voltage, If the supply source selection unit is configured as such, the battery after the completion of charging is discharged until the output voltage of the battery is equal to the threshold voltage. Thereafter, electric power is supplied to the power supply circuit from the charger, and a discharge from the battery is stopped.

That is, power supply to the power supply circuit (and further to the control unit) in the battery pack from the charger is stopped from when the battery becomes fully charged until when the battery is discharged by operation of the power supply circuit and the control unit and the battery voltage is equal to the threshold voltage.

During the stop, even if the battery pack is attached, electric power is not supplied to the battery pack from the charger. Thus, standby electricity consumed by the charger can be reduced.

The battery voltage is prohibited from falling below the threshold voltage. Thus, if the threshold voltage is set to a voltage value higher than a minimum voltage required to drive the electrically-powered equipment, electric power can be supplied from the battery to the electrically-powered equipment when the battery pack is removed from the charger and attached to the electrically-powered equipment.

The supply source selection unit may be configured to determine whether or not the charger has failed and select the battery as the power supply source to the power supply circuit when determining that the charger has failed.

If the supply source selection unit is configured as such, if the charger has failed, the power supply circuit in the battery pack is prohibited from receiving power supply from the failed charger to generate the voltage for driving the control unit. Thus, the control unit can be operated with the stable voltage.

The battery pack of the present invention may include a current detection unit configured to detect a current flowing between the battery and the charger. The control unit may be configured to output to the charger a charge permission signal that permits the charger to charge the battery. In this case, the supply source selection unit may be configured to determine that the charger has failed when the current is not detected by the current detection unit after the charge permission signal is outputted from the control unit.

In the battery pack configured as such, when a failure which inhibits the current from flowing to the battery from the charger has occurred to the charger even if the charge permission signal is outputted from the control unit, electric power can be supplied from the battery to the power supply circuit to operate the control unit.

Moreover, the control unit may be configured to output to the charger a charge stop signal that instructs the charger to stop charging of the battery. The supply source selection unit may be configured to determine that the charger has failed when the current is detected by the current detection unit after the charge stop signal is outputted from the control unit.

In the battery pack configured as such, when a failure which allows the current to continue flowing to the battery from the charger has occurred to the charger even if the charge stop signal is outputted from the control unit, electric power can be supplied from the battery to the power supply circuit to operate the control unit.

The supply source selection unit may be configured to select the battery as the power supply source to the power supply circuit, when power supply to the power supply circuit from the charger is not available.

If the supply source selection unit is configured as such, when the battery pack is not attached to the charger, the control unit can be operated by supplying electric power to the power supply circuit from the battery.

Moreover, in this case, the supply source selection unit may be configured to cut off a power supply path from the battery to the power supply circuit when power supply to the power supply circuit from the charger is not available and the output voltage from the battery is smaller than a predetermined overdischarge determination voltage for determining whether or not the battery is in an overdischarged state.

If the supply source selection unit is configured as such, it is possible to inhibit the battery from falling into an overdischarged state by supplying electric power to the power supply circuit from the battery.

BRIEF DESCRIPTION OF THE DRAWINGS

The present invention will now be described below by way of example, with reference to the accompanying drawings in which:

FIG. 6 is a flowchart showing a second variation of the power source switching process.

DETAILED DESCRIPTION OF THE PREFERRED EMBODIMENTS

Figure 1:
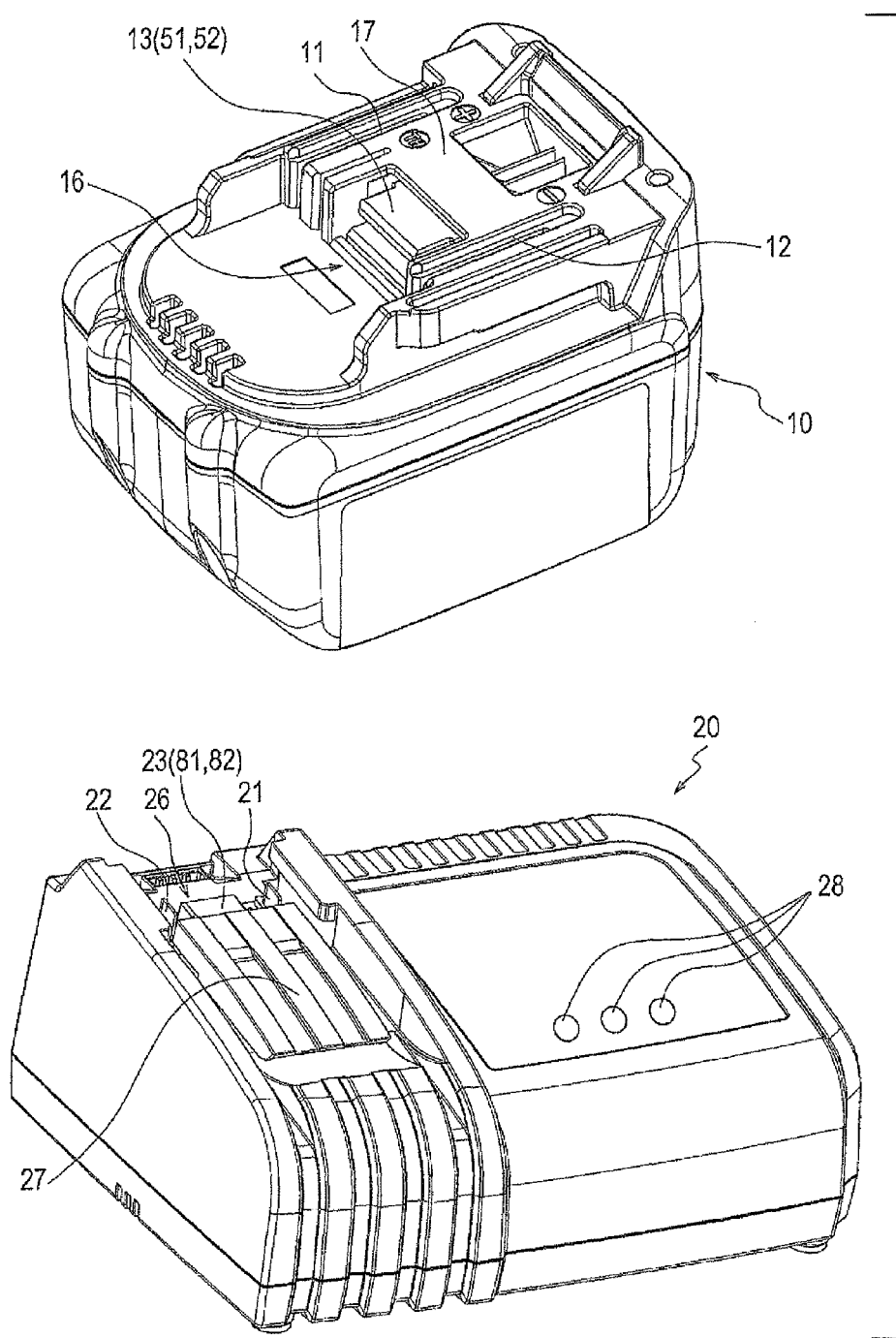
FIG. 1 is a perspective view showing an outer appearance of a battery pack and a charger according to an embodiment to which the present invention is applied.

A battery pack 10 of the present embodiment shown in FIG. 1 is a battery pack detachably attached to a main body of an electric power tool, such as a rechargeable impact driver and a rechargeable drill driver, to supply electric power for driving to the electric power tool.

As shown in FIG. 1, an attachment portion 17 is formed on one side of the battery pack 10 (on top surface of the battery pack 10 in an orientation of the battery pack 10 shown in FIG. 1). The attachment portion 17 is detachably attached to either an attachment portion 27 of a charger 20 or the main body of the electric power tool.

At a predetermined position in the attachment portion 17, a terminal 16 is provided which is electrically connected to either a terminal 26 in the charger 20 or a terminal (not shown) in the main body of the electric power tool.

The terminal 16 includes a positive electrode terminal 11 and a negative electrode terminal 12 through which a current for charge and a current for discharge flow. The terminal 16 also includes a signal terminal group 13 to and from which electric signals are inputted and outputted.

Figure 2:
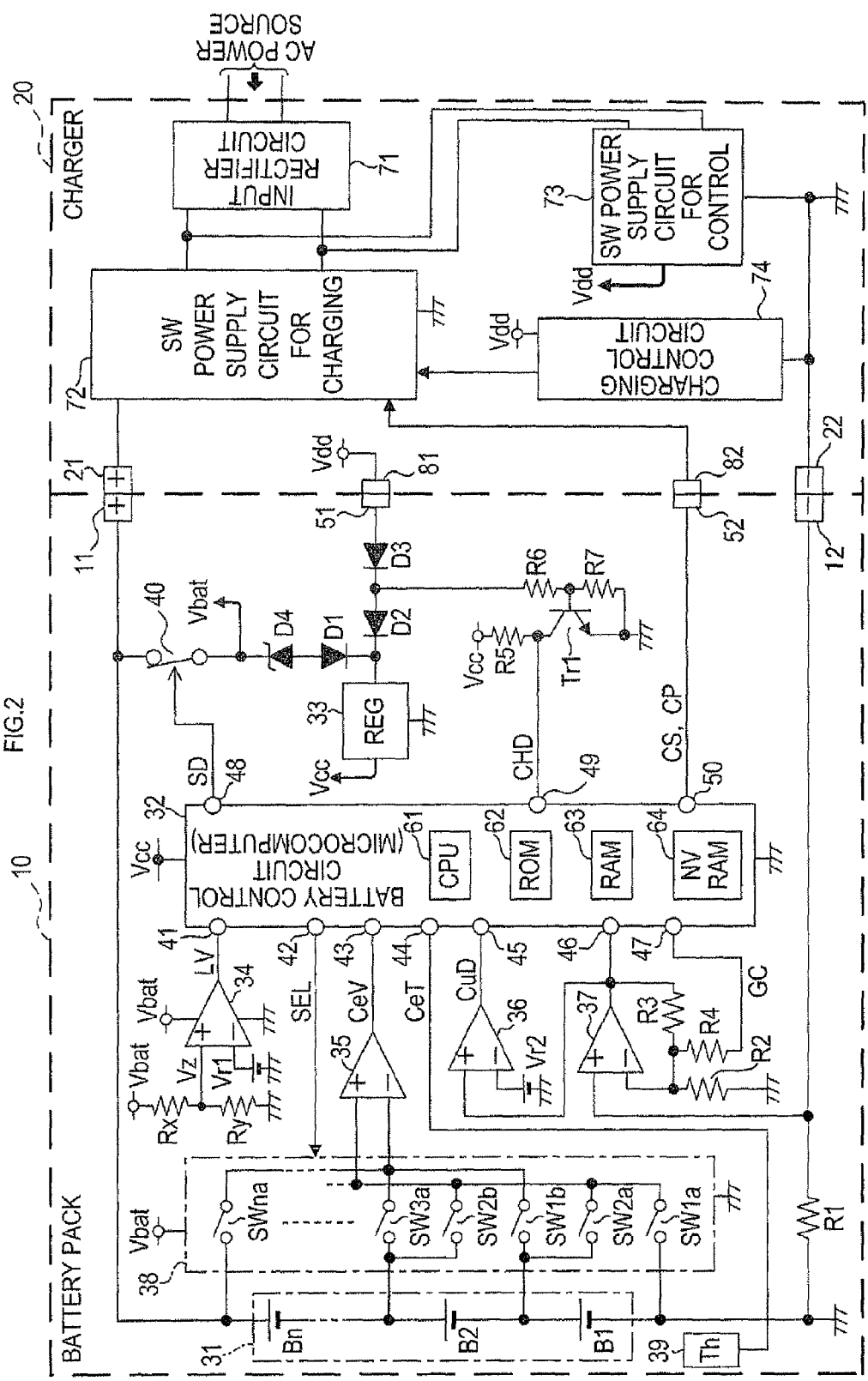
FIG. 2 is a circuit diagram showing a circuit configuration of the battery pack and the charger according to the embodiment.

The signal terminal group 13 is provided with a plurality of terminals including at least a control voltage input terminal 51 and a charge permit/stop signal output terminal 52 (see FIG. 2 for the both terminals).

Next, the charger 20 is configured to generate direct current (DC) power (charge power) for charging a battery 31 in the battery pack 10 from a not shown external power source (alternating-current (AC) 100 V power source in the present embodiment).

At one end of an upper surface of this charger 20, the aforementioned attachment portion 27 to which the battery pack 10 is attached is formed. At a predetermined position in the attachment portion 27 (inside the attachment portion 27), the aforementioned terminal 26 is provided.

The terminal 26 includes a positive electrode terminal 21 and a negative electrode terminal 22 for supplying the charge power to the battery pack 10. The terminal 26 also includes a signal terminal group 23 to and from which electric signals are inputted and outputted.

The signal terminal group 23 is provided with a plurality of terminals including at least a control voltage output terminal 81 and a charge permit/stop signal input terminal 82 (see FIG. 2 for the both terminals).

Further, the charger 20 is provided with a display unit 28 including three LEDs, for displaying an operation state of the charger 20, a charging state of the battery pack 10, and so on.

When the battery pack 10 is attached to the charger 20 configured as above via the attachment portion 27 and the attachment portion 17, the terminal 16 of the battery pack 10 and the terminal 26 of the charger 20 are electrically connected to each other.

More particularly, the positive electrode terminal 11 of the battery pack 10 is connected to the positive electrode terminal 21 of the charger 20, and the negative electrode terminal 12 of the battery pack 10 is connected to the negative electrode terminal 22 of the charger 20.

In addition, the aforementioned input terminal 51 and output terminal 52 which constitute the signal terminal group 13 of the battery pack 10 are respectively connected to the aforementioned output terminal 81 and input terminal 82 which constitute the signal terminal group 23 of the charger 20 (see FIG. 2).

By the connection, a charge from the charger 20 to the battery 31 in the battery pack 10 becomes available.

Figure 3:
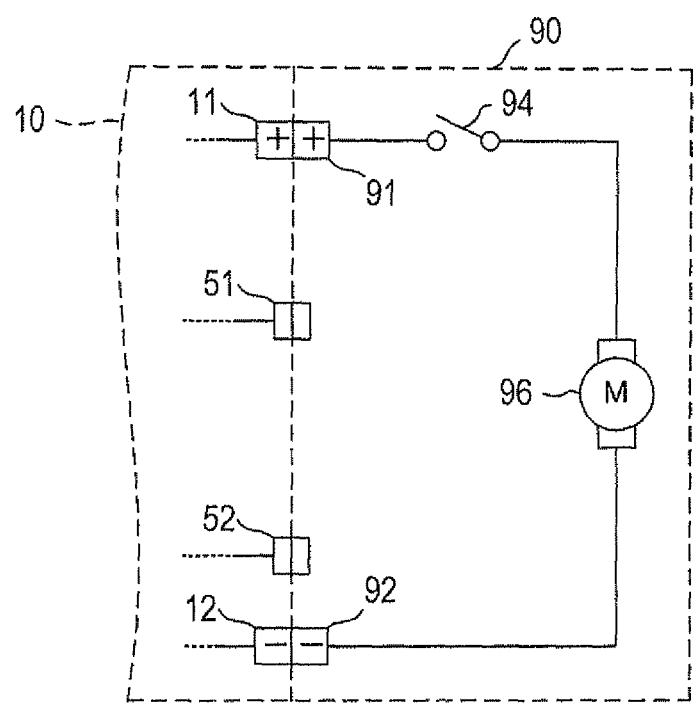
FIG. 3 is a circuit diagram showing a circuit configuration when the battery pack is attached to an electric power tool.

As shown in FIG. 3, an electric power tool 90 which operates by receiving power supply from the battery pack 10 is at least provided with a positive electrode terminal 91 and a negative electrode terminal 92 which are respectively connected to the positive electrode terminal 11 and the negative electrode terminal 12 upon attachment of the battery pack 10.

On the electric power tool 90 side, when a user operates an operation switch 94 to turn on the operation switch 94, a current-carrying path leading from the positive electrode terminal 91 to the negative electrode terminal 92 through the operation switch 94 and a motor 96 is formed.

Therefore, when the battery pack 10 is attached to the electric power tool 90, a current flows to the motor 96 in the electric power tool 90 from the battery 31 in the battery pack 10 so that the electric power tool 90 can be driven.

Next, a circuit configuration of the battery pack 10 and the charger 20 will be described by way of FIG. 2.

As shown in FIG. 2, the battery pack 10 includes a battery 31, a battery control circuit 32 and a regulator 33. The battery control circuit 32 monitors a state of the battery 31, and controls charges and discharges of the battery 31. The regulator 33 generates a voltage (control voltage Vcc: for example, 3.3 VDC) for operating the various circuits in the battery pack 10 including the battery control circuit 32.

The battery control circuit 32 of the present embodiment is configured as a microcomputer including a CPU 61, a ROM 62, a RAM 63, and a NVRAM (non-volatile memory) 64. The battery control circuit 32 operates with the control voltage Vcc generated by the regulator 33, and performs various controls in accordance with various programs stored in the ROM 62. Hereinafter, the battery control circuit 32 is also referred to as the microcomputer 32.

The battery 31 is provided with a plurality of battery cells B1, B2, . . . , and Bn connected in series. A positive electrode side of the battery 31 is connected to the positive electrode terminal 11, and a negative electrode side of the battery 31 is connected to the negative electrode terminal 12.

In the present embodiment, each of the battery cells B1, B2, . . . , and Bn is a lithium ion rechargeable battery having a rated voltage of 3.6 VDC. Four lithium ion rechargeable batteries are connected in series. Therefore, an output voltage (battery voltage Vbat) from the battery 31 in the present embodiment is near 14.4 VDC at normal time.

The battery voltage Vbat is inputted to the regulator 33 through a shutdown switch 40, a Zener diode D4, and a diode D1. The regulator 33 generates the aforementioned control voltage Vcc based on the inputted battery voltage Vbat.

A cathode of the Zener diode D4 is connected to one end of the shutdown switch 40, and an anode of the Zener diode D4 is connected to an anode of the diode D1. A cathode of the diode D1 is connected to the regulator 33.

On and off of the shutdown switch 40 is shifted over by a shutdown signal SD outputted from the microcomputer 32. When the battery 31 is in order and the charger 20 is not connected, the shutdown switch 40 is in on-state.

Therefore, if the shutdown switch 40 is in on-state, the battery voltage Vbat is inputted to the regulator 33 through the shutdown switch 40, the Zener diode D4, and the diode D1.

However, in this case, since there are a voltage drop caused by a breakdown voltage (e.g., 5 V) of the Zener diode D4 and a voltage drop caused by a forward voltage of the diode D1, the battery voltage Vbat actually inputted to the regulator 33 is a voltage obtained by subtracting these voltage drops from the battery voltage Vbat outputted from the battery 31.

In addition, in the battery pack 10, both the circuits operated with the control voltage Vcc and the circuits operated with the battery voltage Vbat are mixed. Therefore, the battery voltage Vbat inputted via the shutdown switch 40 is not only inputted to the cathode of the Zener diode D4, but also inputted to each circuit operated with the battery voltage Vbat.

Also, a voltage (control voltage Vdd: for example, 5 VDC) generated in the charger 20, other than the aforementioned battery voltage Vbat, is inputted to the regulator 33 through a diode D3 and a diode D2.

That is, to an input side of the regulator 33, not only the cathode of the diode D1 is connected but also a cathode of the diode D2 is connected. An anode of the diode D2 is connected to a cathode of the diode D3, and an anode of the diode D3 is connected to the control voltage input terminal 51.

The control voltage Vdd is inputted to the control voltage input terminal 51 from the charger 20, as will be described later. Therefore, the control voltage Vdd inputted to the control voltage input terminal 51 is inputted to the regulator 33 via the diode D3 and the diode D2.

That is, in the battery pack 10 of the present embodiment, the regulator 33 is a so-called dropper-type regulator configured to generate the control voltage Vcc based on either one of the battery voltage Vbat and the control voltage Vdd.

Particularly, the battery voltage Vbat is inputted to the regulator 33 through the diode D1, and the control voltage Vdd is inputted to the regulator 33 through the diode D2. Thereby, the greater of the battery voltage Vbat and the control voltage Vdd is inputted to the regulator 33.

Owing to the above configuration, when the battery 31 is in order and the shutdown switch 40 is in on-state, the battery voltage Vbat is inputted to the regulator 33 through the diode D1. Based on the inputted battery voltage Vbat, the control voltage Vcc is generated.

On the other hand, in the present embodiment, when a discharge of the battery 31 progresses, for example, because the battery pack 10 is left unattended for a long time, and the battery voltage Vbat is lowered, the microcomputer 32 turns off the shutdown switch 40 in order to inhibit overdischarge of the battery 31.

However, at this time, if the battery pack 10 is attached to the charger 20 and the control voltage Vdd is inputted from the charger 20, the regulator 33 can generate the control voltage Vcc based on the control voltage Vdd.

In addition, if the shutdown switch 40 is in off-state and the battery pack 10 is not attached to the charger 20, the control voltage Vcc is not inputted to the microcomputer 32 and its operation is stopped.

Thereafter, when the battery pack 10 is attached to the charger 20 and the control voltage Vdd is inputted to the battery pack 10 from the charger 20, the control voltage Vcc is generated in the regulator 33, Thus, the microcomputer 32 is started up and returns to normal operation.

The battery pack 10 further includes: a cell selection switch circuit 38; a differential amplifier circuit 35; a temperature detection circuit 39; a comparator 34 for voltage drop detection; a current detecting resistor R1; a non-inverting amplifying circuit constituted by an operational amplifier 37 and resistors R2, R3 and R4; a comparator 36 for discharge detection; and a transistor Tr1 for charger detection.

The cell selection switch circuit 38 is a circuit for selectively outputting any one of voltages (cell voltages) of the battery cells B1, B2, . . . , and Bn which constitute the battery 31. The cell selection switch circuit 38 includes a plurality of switches SW1a, SW2a, SW1b, SW2b, SW3a, . . . , and SWna.

The cell selection switch circuit 38 is operated with the battery voltage Vbat and, according to a cell selection signal SEL from the microcomputer 32, outputs to the differential amplifier circuit 35 a voltage of one of the battery cells instructed by the cell selection signal SEL.

The differential amplifier circuit 35 is operated with the control voltage Vcc, and amplifies the voltage inputted from the cell selection switch circuit 38 (i.e., potential difference of one of the selected battery cells). Then, the differential amplifier circuit 35 outputs the amplified cell voltage to the microcomputer 32 as a cell voltage signal CeV.

Owing to the above configuration, for example, if the battery cell B1 having a lowest electrical potential is selected by the cell selection signal SEL, the switch SW1a connected between a negative electrode of the battery cell B1 and a non-inverting input terminal of the differential amplifier circuit 35, and the switch SW1b connected between a positive electrode of the battery cell B1 and an inverting input terminal of the differential amplifier circuit 35 are in on-state, and all the other switches are in off-state, in the cell selection switch circuit 38.

Therefore, in this case, the cell voltage of the battery cell B1 selected by the cell selection signal SEL is inputted to the differential amplifier circuit 35 from the cell selection switch circuit 38. The cell voltage signal CeV obtained by amplifying the cell voltage of the battery cell B1 is inputted from the differential amplifier circuit 35 to the microcomputer 32.

The temperature detection circuit 39 is a circuit which is provided in a vicinity of the battery 31, detects a temperature (cell temperature) of the battery cell, and outputs to the microcomputer 32 a cell temperature signal CeT indicating the detected cell temperature. The temperature detection circuit 39 is configured as a well-known temperature sensor provided with a thermosensor such as a thermistor, for example.

The comparator 34 operates by the battery voltage Vbat (or the control voltage Vcc), and determines whether or not the battery voltage Vbat is equal to or greater than a predetermined threshold voltage Vs1 (10 V, for example) for overdischarge determination.

Particularly, to the non-inverting input terminal of the comparator 34, a divided battery voltage value Vz obtained by dividing the battery voltage Vbat by resistors Rx and Ry is inputted. To the inverting input terminal, a predetermined first reference voltage Vr1 is inputted.

Then, the comparator 34 determines whether or not the divided battery voltage value Vz is equal to or greater than the first reference voltage Vr1, thereby to determine whether or not the battery voltage Vbat is equal to or greater than the threshold voltage Vs1 for overdischarge determination. When the battery voltage Vbat is lower than the threshold voltage Vs1, a voltage drop detection signal LV of low level is outputted to the microcomputer 32.

Next, the resistor R1 is provided on a current-carrying path leading to the negative electrode of the battery 31 from the negative electrode terminal 12. Voltage drop (voltage signal) caused by a discharge current or a charge current in the resistor R1 is inputted to the operational amplifier 37 which constitutes the non-inverting amplifying circuit.

In the non-inverting amplifying circuit, the operational amplifier 37 operates with the control voltage Vcc. The non-inverting amplifying circuit is configured in a well-known manner. A voltage signal generated in the resistor R1 is inputted to a non-inverting input terminal of the operational amplifier 37. An inverting input terminal of the operational amplifier 37 is connected to a ground (ground potential) of the battery pack 10 via the resistor R2 and connected to an output terminal of the operational amplifier 37 via the resistor R3.

In the non-inverting amplifying circuit of the present embodiment, since a resistor R4 is connected between the inverting input terminal of the operational amplifier 37 and the microcomputer 32, a gain of the non-inverting amplifying circuit can be switched to two types.

Particularly, one end of the resistor R4 is connected to the inverting input terminal of the operational amplifier 37, and the other end is connected to an output port 47 of the microcomputer 32 for outputting a gain switching signal GC. The microcomputer 32, by shifting a logical value outputted from the output port 47 to one of high impedance and low level, realizes gain switching of the non-inverting amplifying circuit.

That is, the microcomputer 32 sets the logical value of the gain switching signal GC to high impedance to reduce the gain of the non-inverting amplifying circuit when a discharge current is large, for example, when the electric power tool is being used. Thereby, the microcomputer 32 sets the non-inverting amplifying circuit to be able to properly detect the large discharge current (for example, a large current of several tens of amperes (A)).

On the contrary, when the discharge current is small (near 0 A, for example), or when a discharge current is negative (i.e., when a charge current flows), the microcomputer 32 sets the logical value of the gain switching signal GC to low level to increase the gain of the non-inverting amplifying circuit. Thereby, even a very small current can be reliably detected.

In this way, the microcomputer 32, by switching the gain of the non-inverting amplifying circuit in accordance with the value of the discharge current, allows proper detection of the discharge current regardless of its magnitude.

The comparator 36 operates with the control voltage Vcc, and detects a start of power supply to the electric power tool 90 from the battery 31 when the battery pack 10 is attached to the electric power tool 90.

The comparator 36 outputs to the microcomputer 32 a discharge detection signal CuD of high level when a current detection signal outputted from the operational amplifier 37 is equal to or greater than a predetermined second reference voltage Vr2. When the current detection signal becomes lower than the second reference voltage Vr2, the comparator 36 outputs to the microcomputer 32 the discharge detection signal CuD of low level.

The transistor Tr1 is a NPN bipolar transistor in the present embodiment. A base of the transistor Tr1 is connected to the control voltage input terminal 51 via a resistor R6 and the diode D3. An emitter of the transistor Tr1 is connected to the ground. The control voltage Vcc is applied to a collector of the transistor Tr1 via a resistor R5. The collector of the transistor Tr1 is connected to an input port 49 of the microcomputer 32 for inputting a charger connection detection signal.

When the battery pack 10 is attached to the charger 20, the control voltage Vdd generated in the battery charger 20 is not only inputted to the regulator 33 via the diode D2 as described above but also inputted to the base of transistor Tr1 via the resistor R6 as a charger connection signal.

By the charger connection signal, the transistor Tr1 is in on-state. An electrical potential of the collector of the transistor Tr1, that is, a logical value of a charger connection detection signal CHD inputted to the microcomputer 32 becomes low level.

In other words, when the battery pack 10 is not attached to the charger 20, the transistor Tr1 is in off-state, and the logical value of the charger connection detection signal CHD becomes high level by the control voltage Vcc inputted via the resistor R5.

On the other hand, when the battery pack 10 is attached to the charger 20, and the control voltage Vdd is inputted from the charger 20, the transistor Tr1 is in on-state, and the logical value of the charger connection detection signal CHD becomes low level.

Therefore, the microcomputer 32 can determine whether or not the battery pack 10 is attached to the charger 20 (whether or not the control voltage Vdd is inputted from the charger 20, in detail) based on the logical value of the charger connection detection signal CHD.

The microcomputer 32 includes, as a port to or from which a signal is inputted or outputted, an input port 41 to which the voltage drop detection signal LV from the comparator 34 is inputted, an output port 42 from which the cell selection signal SEL to the cell selection switch circuit 38 is outputted, an input port 43 to which the cell voltage signal CeV from the differential amplifier circuit 35 is inputted, an input port 44 to which the cell temperature signal CeT from the temperature detection circuit 39 is inputted, an input port 45 to which the discharge detection signal CuD from the comparator 36 is inputted, an input port 46 to which the current detection signal from the operational amplifier 37 is inputted, the aforementioned output port 47 from which the gain switching signal GC is outputted, an output port 48 from which a shutdown signal SD to control the shutdown switch 40 is outputted, the input port 49 to which the charger connection detection signal CHD from the transistor Tr1 is inputted, and an output port 50 from which a charge permission/stop signal (charge permission signal CP, charge stop signal CS) to the charger 20 is outputted.

The microcomputer 32 performs a charging control process as follows: when the battery pack 10 is attached to the charger 20, the microcomputer 32 outputs a charge permission signal CP to allow the charger 20 to charge the battery 31; and when charging of the battery 31 is complete, the microcomputer 32 outputs a charge stop signal CS to stop the charger 20 from charging the battery 31.

Now, a circuit configuration of the charger 20 will be described.

As shown in FIG. 2, the charger 20 includes an input rectifier circuit 71, a switching power supply circuit 72 for charging, a switching power supply circuit 73 for control, a charging control circuit 74, a control voltage output terminal 81, and a signal input terminal 82. The input rectifier circuit 71 rectifies external electric power (in the present embodiment, AC 100 V) to DC power. The power supply circuit 72 generates charge power for charging the battery 31 from the DC power rectified by the input rectifier circuit 71. The power supply circuit 73 generates from the DC power rectified by the input rectifier circuit 71 the aforementioned control voltage Vdd for operating the various circuits in the charger 20 and the battery pack 10. The charging control circuit 74 controls generation of the charge power by the power supply circuit 72 (and further, charging of the battery 31). The control voltage output terminal 81 outputs the control voltage Vdd to the battery pack 10. The charge permission signal CP and the charge stop signal CS from the battery pack 10 are inputted to the signal input terminal 82.

The charger 20 of the present embodiment is configured to perform charging of the battery 31 by constant current control or constant voltage control. Switching between the constant current control and the constant voltage control is performed according to a charging control command from the charging control circuit 74.

Therefore, when charging is performed by constant current control, a charge current having a constant current value is generated as the charge power in the power supply circuit 72, and the generated charge current is supplied to the battery pack 10.

On the other hand, when charging by constant voltage control is performed, a charge voltage having a constant voltage is generated as the charge power in the power supply circuit 72, and the generated charge voltage is supplied to the battery pack 10.

The charge power generated by the power supply circuit 72 is supplied to the battery pack 10 through the positive electrode terminal 21 and the negative electrode terminal 22 of the charger 20.

Similar to the battery control circuit (microcomputer) 32, the charging control circuit 74 of the charger 20 is configured as a microcomputer including a CPU, a ROM, a RAM, and a NVRAM. The charging control circuit 74 operates with the control voltage Vdd generated by the power supply circuit 73, and performs various controls according to various programs stored in the ROM.

The control voltage Vdd is also outputted to the battery pack 10 from the control voltage output terminal 81. That is, when the battery pack 10 is attached to the charger 20, the control voltage input terminal 51 of the battery pack 10 is connected to the control voltage output terminal 81. Thereby, the control voltage Vdd generated in the charger 20 is inputted to the battery pack 10 via the respective terminals 81 and 51.

Also, when the battery pack 10 is attached to the charger 20, the signal output terminal 52 of the battery pack 10 is connected to the signal input terminal 82 of the charger 20. Thereby, the charge permission signal CP and the charge stop signal CS outputted from the microcomputer 32 in the battery pack 10 is inputted to the power supply circuit 72 in the charger 20 via the respective terminals 52 and 82.

Generation (or output) of the charge power by the power supply circuit 72 is controlled by the charge permission signal CP and the charge stop signal CS from the battery pack 10. That is, the power supply circuit 72 is configured to generate and output the charge power to the battery pack 10 when the charge permission signal CP is outputted from the battery pack 10, and to stop generation (or output) of the charge power when the charge stop signal CS is outputted from the battery pack 10, so that the charge power is not to be inputted to the battery pack 10 (i.e., so that the battery 31 is not to be charged).

In the battery pack 10 configured as described above, the microcomputer 32, except for cases in a sleep mode and a shutdown mode which will be described later, monitors the cell temperature, the cell voltage of each battery cell, and the current during charges and discharges of the battery 31, etc., at all times.

On the other hand, when a predetermined condition to shift to the sleep mode is satisfied, such as when power supply to the main body of the electric power tool is not performed, the microcomputer 32 shifts the operation mode of the microcomputer 32 to the sleep mode to lower power consumption of the battery 31 as compared in normal operation.

However, in the sleep mode, power supply to the various parts in the battery pack 10, including the microcomputer 32, is not necessarily stopped completely. Electric power to perform minimum operation required for the microcomputer 32 to return from the sleep mode and wake up continues to be supplied.

Particularly, the microcomputer 32 is configured to at least perform determination on whether or not a discharge is initiated based on the current detection signal from the comparator 36, determination on whether or not the charger 20 is connected based on the charger connection detection signal from the transistor Tr1, and determination on whether or not the divided battery voltage value Vz is lower than the first reference voltage Vr1 based on the voltage drop detection signal from the comparator 34 (i.e., whether or not the battery voltage Vbat is lower than 10 V in the present embodiment), after shifted to the sleep mode.

Thereby, the microcomputer 32, after shifted to the sleep mode, if one of the return conditions that a discharge from the battery 31 is started, the charger 20 is connected, and the divided battery voltage value Vz becomes lower than the first reference voltage Vr1, is satisfied, returns to normal operation again from the sleep mode.

The microcomputer 32, when returned to normal operation due to the start of a discharge, controls the discharge while monitoring the state of the battery 31. When returned to normal operation due to connection of the charger 20, the microcomputer 32 is shifted to a charge monitoring mode, and performs a charge monitoring control process including various types of control related to charging, state monitoring of the battery 31 during charging, and so on.

When the battery pack 10 is attached to the charger 20, and the control voltage Vdd is inputted from the charger 20, the microcomputer 32 operates at all times, and continues monitoring control of monitoring the state of the battery 31 even after completion of charging of the battery 31.

When returned to normal operation due to drop of the battery voltage, the microcomputer 32, by turning off the shutdown switch 40 by the shutdown signal, shifts to the shutdown mode in which power consumption of the battery 31 is smaller than in the sleep mode.

In addition, the microcomputer 32, apart from the monitoring control and the charge and discharge control of the battery 31 as above, executes a power source switching process that switches a voltage to be a power source which generates the control voltage Vcc in the regulator 33 (hereinafter, also referred to as BMU voltage; the "BMU" stands for "Battery Management Unit" constituted by the microcomputer 32 and its peripheral circuits) to between the battery voltage Vbat and the control voltage Vdd.

The power source switching process will be described below in detail with reference to the flowchart of FIG. 4, since the process is a main process related to the present invention.

The power source switching process is a process that is repeatedly executed together with the monitoring control of the battery 31 during operation of the microcomputer 32.

When the power source switching process is started, firstly in S110 (S represents a step), it is determined whether or not the control voltage Vdd supplied from the charger 20 is currently set as the BMU voltage.

When the control voltage Vdd is set as the BMU voltage, the shutdown switch 40 is turned off in a later described process of S130.

Next, when it is determined in S110 that the control voltage Vdd is currently set as the BMU voltage, the process proceeds to S120. It is then determined whether or not the charger 20 is removed from the battery pack 10 (particularly, whether or not the battery pack 10 is detached from the charger 20 after the shutdown switch 40 is turned off in the previous process of S130). This determination is performed based on the charger connection detection signal CHD.

Then, when it is determined in S120 that the charger 20 is connected to the battery pack 10, the process proceeds to S130. The shutdown switch 40 is turned off by the shutdown signal SD, and the power source switching process is terminated.

When the process of S130 is executed in this way, the control voltage Vdd is set as the BMU voltage. As a result, the battery voltage Vbat is supplied to the regulator 33 so that power consumption of the battery 31 by the regulator 33 (and further by the microcomputer 32) can be inhibited.

Next, it is determined in S120 that the charger 20 is removed from the battery pack 10, the process proceeds to S140. The shutdown switch 40 is turned on by the shutdown signal SD, and the power source switching process is terminated.

As a result, the battery voltage Vbat is supplied to the regulator 33 via the shutdown switch 40. Even if the battery pack 10 is removed from the charger 20, the control voltage Vcc is continuously outputted from the regulator 83.

Until the process of S140 is executed after the battery pack 10 is removed from the charger 20, power supply to the regulator 33 is cut off. However, since the power source switching process is repeatedly executed in the microcomputer 32, the cut-off time is extremely short.

In the regulator 33, since a capacitor is provided to stabilize the control voltage Vcc, the control voltage Vcc is inhibited from being lowered due to such instantaneous interruption of power supply.

Next, when it is determined in S110 that the control voltage Vdd is not currently set as the BMU voltage, the process proceeds to S150. It is determined whether or not the battery voltage Vbat is equal to or greater than the threshold voltage Vs1 for overdischarge determination.

In S150, when the voltage drop detection signal LV (low level) is inputted from the comparator 34, it is determined that the battery voltage Vbat is smaller than the threshold voltage Vs1.

Then, when it is determined in S150 that the battery voltage Vbat is equal to or greater than the threshold voltage Vs1, the process proceeds to S160. It is then determined whether or not connection between the battery pack 10 and the charger 20 continues for a predetermined period of time (for example, one second) or more. The determination on whether or not the battery pack 10 is connected to the charger 20 is performed based on the charger connection detection signal CHD.

If it is determined in S160 that the connection between the battery pack 10 and the charger 20 continues for the predetermined period of time or more, the process proceeds to S130 described above, to turn off the shutdown switch 40 by the shutdown signal SD. Then, the power source switching process is terminated.

On the other hand, when it is determined in S160 that there is no connection between the battery pack 10 and the charger 20, or the connection has not continued for the predetermined period of time or more, the process proceeds to S170.

In S170, the shutdown switch 40 is turned on by the shutdown signal SD thereby to set the battery voltage Vbat as the BMU voltage. Then, the power source switching process is terminated.

Next, in S150, if it is determined that the battery voltage Vbat is smaller than the threshold voltage Vs1, the shutdown switch 40 is turned off by the shutdown signal SD in order to protect the battery 31 from overdischarge. Then, the power source switching process is terminated.

When the shutdown switch 40 is turned off in S180, the microcomputer 32 is shifted to the shutdown mode and stops working completely because there is no supply of the control voltage Vdd from the charger 20.

Thereafter, when the battery pack 10 is attached to the charger 20, and the control voltage Vdd is supplied to the battery pack 10 from the charger 20, the control voltage Vcc is supplied from the regulator 33 to the microcomputer 32 so that the microcomputer 32 is activated to execute charging control of the battery 31 and the power source switching process.

As described above, according to the battery pack 10 of the present embodiment, even in the case where the battery voltage Vbat is equal to or greater than the threshold voltage Vs1 for overdischarge determination, and it is possible to normally perform power supply to the regulator 33 from the battery 31, the control voltage Vdd is selected as the BMU voltage, when the battery pack 10 is attached to the charger 20 and the control voltage Vdd is supplied from the charger 20.

Because the selection is performed by turning off the shutdown switch 40, the battery voltage Vbat is supplied to the regulator 33, and electric power of the battery 31 is inhibited from being consumed in the regulator 33 (and in the microcomputer 32).

Thus, according to the battery pack 10 of the present invention, even if the user attaches the battery pack 10 to the charger 20 to charge the battery 31 and then forgets to remove the battery pack 10 from the charger 20, the battery 31 is inhibited from being discharged through the regulator 33 (and the microcomputer 32). Thereafter, when the battery pack 10 is attached to the electric power tool 90, the electric power tool 90 can be driven normally.

On the other hand, when the battery pack 10 is not attached to the battery charger 20, the shutdown switch 40 is turned on, and electric power is supplied to the regulator 33 from the battery 31.

In this state, when the electric power of the battery 31 is consumed by the internal circuit of the battery pack 10 and the electric power tool 90, and the battery voltage Vbat is smaller than the threshold voltage Vs1, the shutdown switch 40 is turned off, the power supply from the battery 31 to the regulator 33 (and to the microcomputer 32) is cut off.

Therefore, according to the battery pack 10 of the present embodiment, it is also possible to inhibit the battery 31 from becoming overdischarged by power supply to the regulator 33.

Here, in the battery pack 10 of the present embodiment, the battery 31 corresponds to an example of a battery of the present invention, the microcomputer (battery control circuit) 32 corresponds to an example of a control unit of the present invention and an example of a supply source selection unit of the present invention. The regulator 33 corresponds to an example of a power supply circuit of the present invention, the resistors R1 to R4 and the operational amplifier 37 correspond to an example of a current detection unit of the present invention.

An embodiment of the present invention has been described in the above. However, the battery pack of the present invention is not limited to the above embodiment, and can take various forms within the scope not departing from the gist of the present invention.

For example, in the above embodiment, when the battery pack 10 is attached to the charger 20, and the control voltage Vdd is supplied to the battery pack 10 from the charger 20, the shutdown switch 40 is turned off regardless of the battery voltage Vbat.

However, in this way, electric power is always supplied from the charger 20 to the regulator 33 (and to the microcomputer 32), when the battery pack 10 is attached to the charger 20. Thus, standby power of the charger 20 increases.

Figure 5:
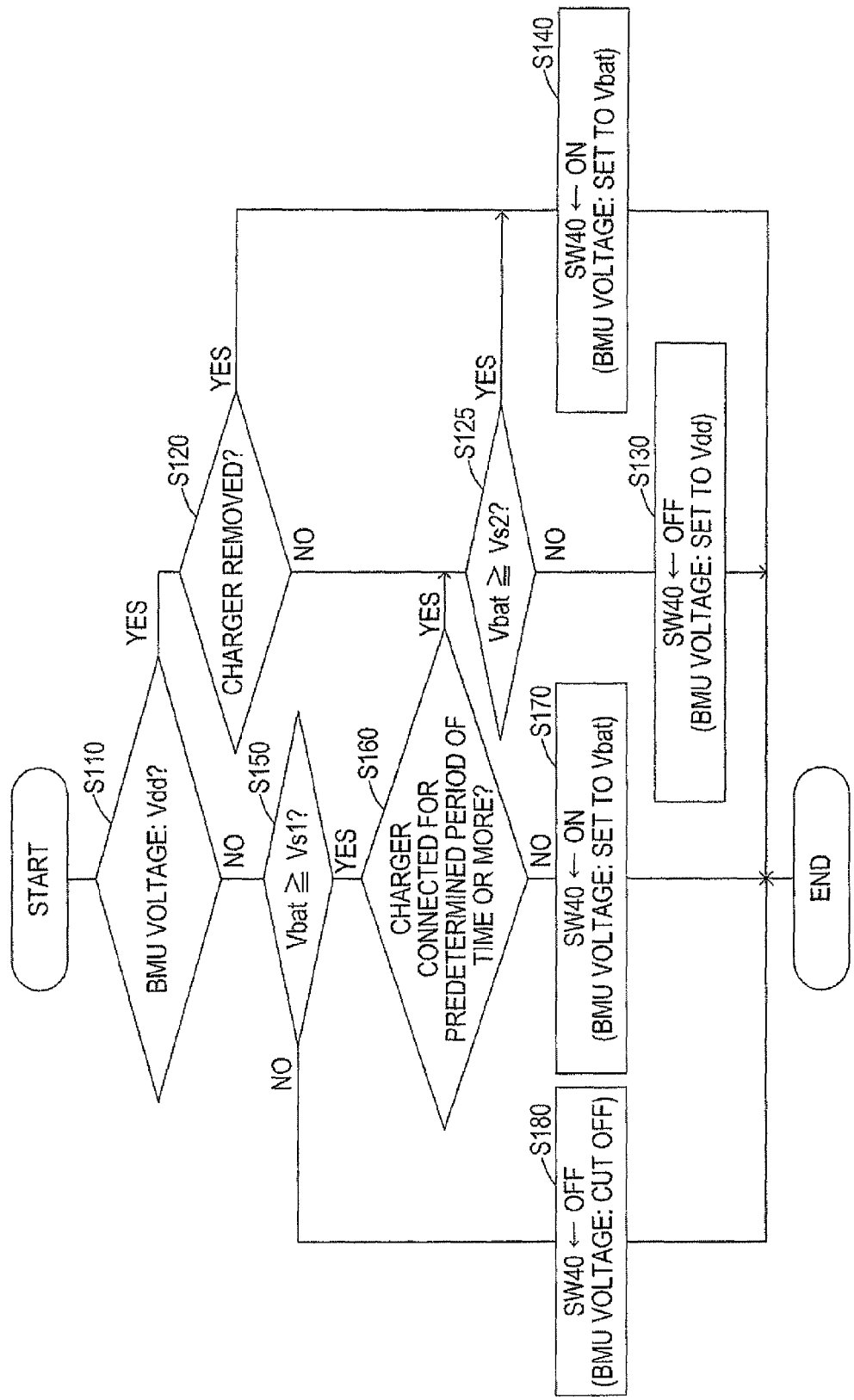
FIG. 5 is a flowchart showing a first variation of the power source switching process.

In this case, as shown in FIG. 5, when it is determined in S120 that the charger 20 is connected, and in S160 that the charger 20 has been connected for a predetermined period of time or more, the determination process in S125 may be executed, in the power source switching process.

That is, in S125, it is determined whether or not the battery voltage Vbat is equal to or greater than a threshold voltage Vs2 which is a voltage value greater than the threshold voltage Vs1 for overdischarge determination.

If the battery voltage Vbat is equal to or greater than the threshold voltage Vs2, the shutdown switch 40 is turned on in S140. If the battery voltage Vbat is smaller than the threshold voltage Vs2, the shutdown switch 40 is turned off in S130.

That is, in this way, after the battery pack 10 is attached to the charger 20 and the battery 31 is charged, it is possible to inhibit a current from flowing to the battery pack 10 from the charger 20 until the battery 31 is discharged by the operation of the regulator 33 and the microcomputer 32 and the battery voltage drops to the threshold voltage Vs2. The standby power of the charger 20 can be reduced.

On the other hand, in the embodiment described above, the charger connection detection signal CHD is used when it is determined in S120 whether or not the battery pack 10 is connected to the charger 20. Therefore, even if the battery pack 10 is attached to the charger 20, the battery voltage Vbat is selected as the BMU voltage when supply of external power is cut off, or the control voltage Vdd is no longer supplied to the battery pack 10 from the charger 20 due to failure of the charger 20, etc. Therefore, the control voltage Vcc is stably outputted from the regulator 33.

However, even if the control voltage Vdd is supplied to the battery pack 10 from the charger 20, and it is determined in S120 that the battery pack 10 is connected to the charger 20, it is conceivable that the charger 20 may fail and switching between charging and stop of charging to the battery 31 may no longer be performed normally.

Further, if the control voltage Vdd is selected as the BMU voltage when such problem is occurring to the charger 20, it is not possible to generate the control voltage Vcc in a stable manner in the regulator 33.

Thus, as shown in FIG. 6, when it is determined in S120 that the charger 20 is connected, and when it is determined in S160 that the charger 20 is connected for a predetermined period of time or more in the power source switching process, whether or not the charger 20 has failed may be determined in S128.

Particularly, it is determined that the charger 20 has failed, for example, when a charge current is not detected through the resistor R1 even though the charge permission signal CP is outputted to the charger 20, or when a charge current is detected via the resistor R1 despite that the charge stop signal CS is outputted to the charger 20. In this case, failure of the charger 20 is determined by means of the current detection signal inputted from the operational amplifier 37.

Then, when it is determined in S128 that the charger 20 has failed, the process proceeds to S140. The shutdown switch 40 is turned on so that the battery voltage Vbat is selected as the BMU voltage.

Further, when it is determined in S128 that the charger 20 has not failed, the process proceeds to S130. The shutdown switch 40 is turned off so that the control voltage Vdd is selected as the BMU voltage.

That is, in this way, it is possible to inhibit the control voltage Vdd from being selected as the BMU voltage when the charger 20 has failed, and inhibit the control voltage Vcc generated by the regulator 33 from becoming unstable.

In FIG. 6, it is described that the determination process of S128 is executed when it is determined that the charger 20 is connected in S120, and when it is determined that the charger 20 is connected for a predetermined period of time or more in S160. However, the determination process of S128 may be executed after the determination process of S125 shown in FIG. 5.

That is, when it is determined in the determination process of S125 shown in FIG. 5 that the battery voltage Vbat is smaller than the threshold voltage Vs2, the determination process of S128 may be executed.

Further, when it is determined in the determination process of S128 in FIG. 6 that the charger 20 has not failed, the determination process of S125 shown in FIG. 5 may be executed.

In this way, under the conditions that the battery voltage Vbat is smaller than the threshold voltage Vs2 and the charger 20 has not failed, selection of the control voltage Vdd as the BMU voltage can be facilitated.

Next, in the above embodiment, the dropper type regulator is described as an example of the regulator 33. This is only an example. A boost regulator may be also used to generate the control voltage Vcc higher than an input voltage. The specific configuration of the regulator 33 is not particularly limited.

Also, in a case where the control voltage Vdd generated in the charger 20 has the same voltage value as the control voltage Vcc, a switch may be provided in the regulator 33, for example. When the control voltage Vdd is selected as the BMU voltage, the control voltage Vdd may be directly supplied to the microcomputer 32 and to the peripheral circuits via the switch.

Further, in the embodiment described above, it is described that the charge permission signal CP or the charge stop signal CS is outputted to the charger 20 from the battery pack 10, as a result of monitoring of the battery 31 by the microcomputer 32. It goes without saying that the type of monitoring content outputted to the charger 20 from the battery pack 10 is not limited to the above signals CP and CS. Signals, data and others having various contents can be outputted to the charger 20 as long as they directly or indirectly indicate the state of the battery 31.

Further, in the above embodiment, it is described that the battery voltage Vbat is 14.4 V, for example, the control voltage Vcc is 3.3 V, for example, and the control voltage Vdd is 5 V, for example. It goes without saying that each of these numerical values is merely an example. The same applies to the breakdown voltage (5 V) of the Zener diode D4.

The battery 31 is constituted by four battery cells connected in series, in the above embodiment. This is only an example. The number of battery cells constituting the battery 31 is not particularly limited. The battery 31 may have a single battery cell, or may have battery cells connected in series or in parallel. Further, it is needless to say that also the voltage of one battery cell and the battery voltage are not limited to the values illustrated in the above embodiment.

Also in the above embodiment, the case is described as an example in which each of the battery cells constituting the battery 31 is a lithium ion rechargeable battery. This is merely an example. The present invention can be applied to a case in which the battery cell is not a lithium ion rechargeable battery as well.

Figure 4:
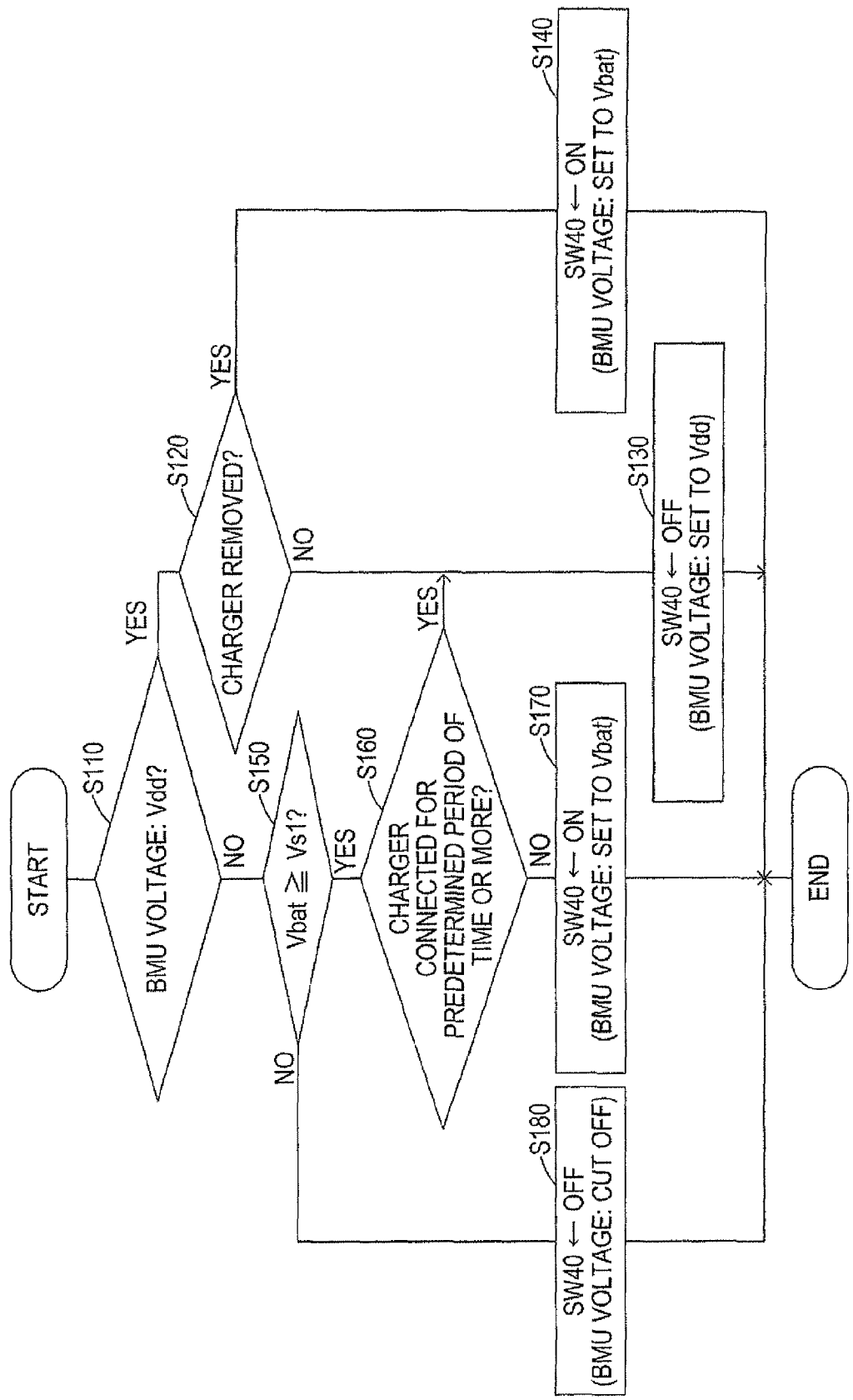
FIG. 4 is a flowchart showing a power source switching process executed by a battery control circuit (microcomputer) in the battery pack.

In the power, source switching process shown in FIGS. 4 to 6, it is determined in S160 whether or not at least one second has passed since the battery pack 10 is connected to the charger 20 in order to confirm that the connection with the charger 20 and the battery pack 10 is electrically stable.

However, the user may remove the battery pack 10 from the charger 20 immediately after the charger 20 is once attached to the battery pack 10. In this case, there is no need to switch the power supply to the microcomputer 32 from the battery 31 to the charger 20.

For this reason, determination time in S160 may be set to, for example, one minute or more.

In other words, the determination time in S160 can be delayed if the battery 31 is in a level which does not cause overdischarge. For example, the determination time in S160 may be appropriately set within a range of a few minutes since the range does not cause any problem.

Also, in the above embodiment, the battery control circuit 32 is configured as a microcomputer. The battery control circuit 32 may be configured as an ASIC (Application Specific Integrated Circuits), a programmable logic device, such as an FPGA (Field Programmable Gate Array), or a discreet circuit.

What is claimed is:

1. A battery pack configured to be attachable to a charger and electrically-powered equipment, the battery pack comprising:
    a battery that is configured to be chargeable by the charger;
    a control unit that is configured to monitor a state of the battery to control charges to the battery and discharges from the battery;
    a power supply circuit that is configured to receive electric power selectively from one of the battery and the charger, and generate a voltage for driving the control unit; and
    a switch that is provided on a power supply path between the battery and the power supply circuit, the switch configured to be turned on or off by the control unit to thereby connect or disconnect the power supply path,
    wherein the control unit is further configured to turn off the switch thereby to select the charger as a power supply source to the power supply circuit at least in a case where the battery is not in an overdischarged state and the battery pack is attached to the charger.

2. The battery pack according to claim 1, wherein
    the control unit is configured (i) to turn off the switch thereby to select the charger as the power supply source to the power supply circuit in a case where the battery is not in the overdischarged state and a predetermined time elapses since the battery pack is attached to the charger, and (ii) to turn on the switch thereby to select the battery as the power supply source to the power supply circuit in a case where the battery is not in the overdischarged state and the predetermined time does not elapse since the battery pack is attached to the charger.

3. The battery pack according to claim 1, wherein
the control unit is configured to determine whether or not the charger has failed and to turn on the switch thereby to select the battery as the power supply source to the power supply circuit when determining that the charger has failed.

4. The battery pack according to claim 3 further comprising a current detection unit configured to detect a current flowing between the battery and the charger, wherein
the control unit is configured to output to the charger a charge permission signal that permits the charger to charge the battery, and to determine that the charger has failed when the current is not detected by the current detection unit after the charge permission signal is outputted from the control unit.

5. The battery pack according to claim 3 further comprising a current detection unit configured to detect a current flowing between the battery and the charger, wherein
the control unit is configured to output to the charger a charge stop signal that instructs the charger to stop charging of the battery, and to determine that the charger has failed when the current is detected by the current detection unit after the charge stop signal is outputted from the control unit.

6. The battery pack according to claim 1, wherein
the control unit is configured to turn on the switch thereby to select the battery as the power supply source to the power supply circuit, when power supply to the power supply circuit from the charger is not available.

7. The battery pack according to claim 6, wherein
the control unit is configured to turn off the switch thereby to cut off the power supply path when power supply to the power supply circuit from the charger is not available and an output voltage from the battery is smaller than a predetermined overdischarge determination voltage for determining whether or not the battery is in the overdischarged state.

* * * * *